United States Patent
Park et al.

(10) Patent No.: US 9,598,292 B2
(45) Date of Patent: Mar. 21, 2017

(54) OXIDE, ELECTROLYTE INCLUDING OXIDE, AND ELECTROCHEMICAL DEVICE INCLUDING OXIDE

(71) Applicant: Samsung Electronics Co., Ltd., Suwon-si, Gyeonggi-do (KR)

(72) Inventors: Hee-jung Park, Suwon-si (KR); Chan Kwak, Yongin-si (KR); Tae-gon Kim, Hwaseong-si (KR); Sang-mock Lee, Yongin-si (KR); Doh-won Jung, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 466 days.

(21) Appl. No.: 14/156,536

(22) Filed: Jan. 16, 2014

(65) Prior Publication Data

US 2015/0001436 A1 Jan. 1, 2015

(30) Foreign Application Priority Data

Jun. 26, 2013 (KR) .................. 10-2013-0073975

(51) Int. Cl.
| | | |
|---|---|---|
| *C01G 17/00* | (2006.01) | |
| *C01G 45/00* | (2006.01) | |
| *H01M 8/12* | (2016.01) | |
| *H01M 10/0562* | (2010.01) | |
| *H01M 10/052* | (2010.01) | |

(52) U.S. Cl.
CPC ......... *C01G 17/006* (2013.01); *C01G 45/006* (2013.01); *H01M 8/1246* (2013.01); *C01P 2002/72* (2013.01); *C01P 2006/40* (2013.01); *H01M 10/052* (2013.01); *H01M 10/0562* (2013.01); *H01M 2008/1293* (2013.01); *H01M 2300/0071* (2013.01); *Y02E 60/521* (2013.01); *Y02E 60/525* (2013.01); *Y02P 70/56* (2015.11)

(58) Field of Classification Search
CPC .............. C01G 17/006; C01G 45/006; H01M 10/0562; G01N 27/404; G01N 27/4073; C01F 5/00; C01F 7/00; C01F 11/02; C01B 33/113

USPC ....... 252/519.1, 62.2, 519.15; 204/424, 415; 429/495, 304, 319; 423/600, 594.9
See application file for complete search history.

(56) References Cited

U.S. PATENT DOCUMENTS

2003/0160216 A1 8/2003 Goutenoire et al.

FOREIGN PATENT DOCUMENTS

| JP | 2001-064638 A | | 3/2001 |
|---|---|---|---|
| JP | 2008120637 | * | 5/2008 |
| KR | 1020100057497 A | | 5/2010 |
| KR | 1020130075529 A | | 7/2013 |

OTHER PUBLICATIONS

Ishihara et al., "Doped LaGaO3 Perovskite type Oxide as a New Oxide Ionic Conductor", J. Am. Chem. Soc., vol. 116, 1994, pp. 3801-3803.
Kejzar, R. et al., "Synthetic Minerals in Basic Electrode Coating and in Welding Powders", Kovine, Zlitine, Tehnologije vol. 26 (1-2), 1992, pp. 255-257.
Kuang et al., "Interstitial oxide ion conductivity in the layered tetrahedral network melilite structure", Nature Materials, vol. 7, Jun. 2008, pp. 498-504.
Lacorre et al., "Designing fast oxide-ion conductors based on La2Mo2O9", Nature, vol. 404, Apr. 20, 2000, pp. 856-858.
Liu et al., "Synthesis and electrical conductivity of various melilite-type electrolytes Ln1+xSr1-xGa3O7+x/2", Solid State Ionics, vol. 191, 2011, pp. 68-72.
Sauerbrey et al., "Corrosion protection of MgO electrodes at 1400 C", Corrosion Science, vol. 51, 2009, pp. 1-5.
Wei et al., "Five-Dimensional Incommensurate Structure of the Melilite Electrolyte [CaNd]2[Ga]2[Ga2O7]2", Journal of the American Chemical Society, 2011, v. 133, pp. 15200-15211.

* cited by examiner

*Primary Examiner* — Steven Bos
(74) *Attorney, Agent, or Firm* — Cantor Colburn LLP

(57) ABSTRACT

An oxide represented by Formula 1:

$$(Sr_{2-x}A_x)(M_{1-y}Q_y)D_2O_{7+d},$$ Formula 1 wherein A is barium (Ba), M is at least one selected from magnesium (Mg) and calcium (Ca), Q is a Group 13 element, D is at least one selected from silicon (Si) and germanium (Ge), $0 \leq x \leq 2.0$, $0 < y \leq 1.0$, and d is a value which makes the oxide electrically neutral.

20 Claims, 7 Drawing Sheets

OXIDE, ELECTROLYTE INCLUDING OXIDE, AND ELECTROCHEMICAL DEVICE INCLUDING OXIDE

CROSS-REFERENCE TO RELATED APPLICATION

This application claims priority to and the benefit of Korean Patent Application No. 10-2013-073975, filed on Jun. 26, 2013 in the Korean Intellectual Property Office, and all the benefits accruing therefrom under 35 U.S.C. §119, the content of which is incorporated herein in its entirety by reference.

BACKGROUND

1. Field

The present disclosure relates to an oxide, an electrolyte including the oxide, and an electrochemical device including the oxide.

2. Description of the Related Art

Recently, environmental and energy problems associated with the use and depletion of fossil fuels are occurring worldwide. As a result, interest in energy conversion and energy storage materials is increasing rapidly.

An oxygen ion conductor for the energy conversion, and energy storage materials, include yttria-stabilized zirconia (YSZ) having a fluorite structure, Ca-doped $ZrO_2$ (CSZ), Gd-doped $CeO_2$ (GDC), and lanthanum strontium manganite (LSGM, wherein the LSGM is formed of La—Sr—Ga—Mg—O, which includes oxide materials such as a lanthanum gallate in which strontium (Sr) and magnesium (Mg) are doped therein) having a perovskite structure.

However, the oxide materials known to date have low ion mobility, which leads to dissatisfactory ion conductivity. Thus, there remains a need for an improved oxygen ion conductor.

SUMMARY

Provided is a novel oxide having excellent ion conductivity.

Provided is an electrolyte including the oxide.

Provided is an electrochemical device including the oxide.

Additional aspects will be set forth in part in the description which follows and, in part, will be apparent from the description.

According to an aspect, provided is an oxide represented by Formula 1:

$$(Sr_{2-x}A_x)(M_{1-y}Q_y)D_2O_{7+d} \quad \text{Formula 1}$$

wherein A is barium (Ba),
M is at least one selected from magnesium (Mg) and calcium (Ca),
Q is a Group 13 element,
D is at least one selected from silicon (Si) and germanium (Ge),
$0 \leq x \leq 2.0$, $0 < y \leq 1.0$, and d is a value which makes the oxide electrically neutral.

According to another aspect, provided is an electrolyte including an oxide represented by Formula 1:

$$(Sr_{2-x}A_x)(M_{1-y}Q_y)D_2O_{7+d} \quad \text{Formula 1}$$

wherein, A is barium (Ba),
M is at least one selected from magnesium (Mg) and calcium (Ca),
Q is a Group 13 element,
D is at least one selected from silicon (Si) and germanium (Ge), $0 \leq x \leq 2.0$, $0 < y \leq 1.0$, and d is a value which makes the oxide electrically neutral.

According to another aspect, provided is an electrochemical device including an oxide represented by Formula 1:

$$(Sr_{2-x}A_x)(M_{1-y}Q_y)D_2O_{7+d} \quad \text{Formula 1}$$

wherein, A is barium (Ba),
M is at least one selected from magnesium (Mg) and calcium (Ca),
Q is a Group 13 element,
D is at least one selected from silicon (Si) and germanium (Ge),
$0 \leq x \leq 2.0$, $0 < y \leq 1.0$, and d is a value which makes the oxide electrically neutral.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
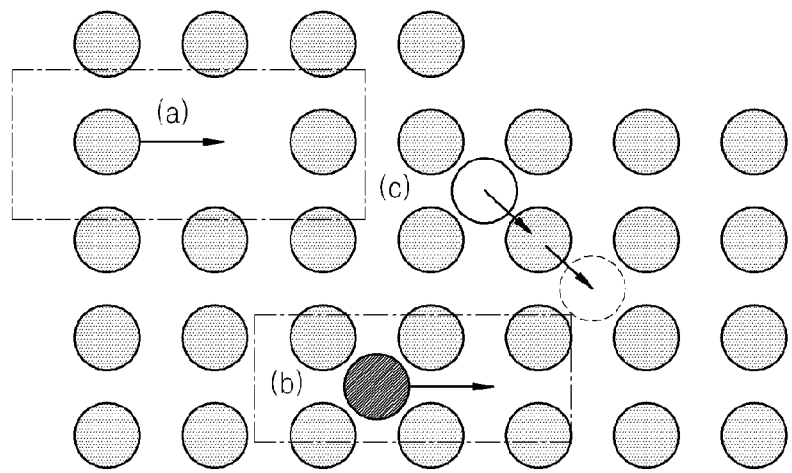
FIG. 1 illustrates an embodiment of a mechanism of lattice diffusion of an oxide.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, oxides according to one or more exemplary embodiments, electrolytes including the oxides, and electrochemical devices including the oxides will be described in detail.

The oxide according to an embodiment is represented by Formula 1.

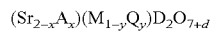     Formula 1

In Formula 1 above, A is barium (Ba), M is at least one selected from magnesium (Mg) and calcium (Ca), Q is a Group 13 element, D is at least one selected from silicon (Si) and germanium (Ge), $0 \leq x \leq 2.0$, $0 < y \leq 1.0$, and d is a value that makes the oxide electrically neutral. In an embodiment, y may be about 0.1 to about 0.5, or 1.0.

The ion conductive oxide may have a crystal structure that belongs to a $P\overline{4}2_1m$ space group. For example, the ion conductive oxide may have a melilite crystal structure.

While not wanting to be bound by theory, it is understood that the oxide includes interstitial oxygen to provide ion conductivity due to movement of oxygen ions. In the oxide, d corresponds to a value that represents the interstitial oxygen content. For example, $0 < d \leq 0.5$, in greater detail, $0.1 < d \leq 0.5$, or $d = \frac{1}{2}y$ wherein $0 < y \leq 1.0$.

For example, in the oxide, Q may be at least one selected from aluminum (Al), gallium (Ga), and indium (In).

In Formula 1 above, y may be, for example, 0.1 to 0.5, or 1.0, and in greater detail, 0.2 to 0.5, and x may be, for example, 0 or 0.1 to 0.4. In Formula 1, when x and y are in the ranges above, the ion conductivity of the oxide of Formula 1 is excellent.

According to an embodiment, an oxide may be represented by Formula 2:

     Formula 2

In Formula 2 above, A is barium (Ba), M is at least one selected from magnesium (Mg) and calcium (Ca), Q is at least one selected from aluminum (Al), gallium (Ga), and indium (In), $0 \leq x \leq 2.0$, $0 < y \leq 1.0$, and d is a value that makes the oxide electrically neutral. In Formula 2, y may be about 0.1 to about 0.5, or 1.0

The oxide may be, for example, $Sr_2(Mg_{0.9}Ga_{0.1})Ge_2O_7$, $Sr_2(Mg_{0.8}Ga_{0.2})Ge_2O_7$, $Sr_2(Mg_{0.7}Ga_{0.3})Ge_2O_7$, $Sr_2(Mg_{0.6}Ga_{0.4})Ge_2O_7$, $Sr_2(Mg_{0.5}Ga_{0.5})Ge_2O_7$, $Sr_2Ga_{1.0}Ge_2O_7$, $Sr_2(Mg_{0.9}In_{0.1})Ge_2O_7$, $Sr_2(Mg_{0.8}In_{0.2})Ge_2O_7$, $Sr_2(Mg_{0.7}In_{0.3})Ge_2O_7$, $Sr_2(Mg_{0.6}In_{0.4})Ge_2O_7$, $Sr_2(Mg_{0.5}In_{0.5})Ge_2O_7$, $Sr_2In_{1.0}Ge_2O_7$, $Sr_2(Mg_{0.9}Al_{0.1})Ge_2O_7$, $Sr_2(Mg_{0.8}Al_{0.2})Ge_2O_7$, $Sr_2(Mg_{0.7}Al_{0.3})Ge_2O_7$, $Sr_2(Mg_{0.6}Al_{0.4})Ge_2O_7$, $Sr_2(Mg_{0.5}Al_{0.5})Ge_2O_7$, or $Sr_2Al_{1.0}Ge_2O_7$.

In greater detail, the oxide may be $Sr_2(Mg_{0.9}Ga_{0.1})Ge_2O_7$, $Sr_2(Mg_{0.8}Ga_{0.2})Ge_2O_7$, $Sr_2(Mg_{0.7}Ga_{0.3})Ge_2O_7$, $Sr_2(Mg_{0.6}Ga_{0.4})Ge_2O_7$, $Sr_2(Mg_{0.5}Ga_{0.5})Ge_2O_7$, $Sr_2Ga_{1.0}Ge_2O_7$, or $Sr_2(Mg_{0.5}In_{0.5})Ge_2O_7$. In an embodiment a combination comprising at least one of the foregoing may be used.

The ion conductivity of the oxide is about $10^{-7}$ S/cm to about $10^{-2}$ S/cm.

FIG. 1 illustrates a mechanism of lattice diffusion of the oxide according to an embodiment.

Referring to FIG. 1, an ion conductor having a fluorite crystal structure and an ion conductor having a perovskite structure may have a conductive mechanism in which oxygen vacancies move to provide conductivity as illustrated in (a) of FIG. 1, or a conductive mechanism in which nearby atoms are pushed away.

On the contrary and while not wanting to be bound by theory, the oxide according to an embodiment has a large free volume of a tetrahedral network, so that the interstitial oxygen may be present therein, and has a mechanism having conductivity due to the movement of the interstitial oxygen. Due to this conductive mechanism, the oxide according to an embodiment has improved ion conductivity. Accordingly, the oxide may be used in various industrial fields, such as in an electrolyte and in an electrode of an electrolytic device, an oxygen permeable membrane, a sensor, an oxygen gas pump, an electrode, a solid electrolyte of a fuel cell, a pump, an electrochromic window, a lithium battery, or a thin film integrated battery, for example.

The fuel cell may be, for example, a solid oxide fuel cell.

The solid oxide fuel cell according to another embodiment includes a first electrode; a second electrode; and a solid oxide electrolyte disposed between the first electrode and the second electrode, wherein the solid oxide electrolyte includes an oxide represented by Formula 1.

In the solid oxide fuel cell, the first electrode may be an air electrode (e.g., a cathode). The second electrode may be a fuel electrode (e.g., an anode).

The solid oxide fuel cell may comprise a stack of unit cells. For example, stack may comprise a plurality of membrane and electrode assemblies (MEAs), wherein each MEA comprises an air electrode, a fuel electrode, and the solid oxide electrolyte. The MEAs may be layered in series, and a separator that electrically connects the MEAs may be disposed between the MEAs to obtain a stack of the MEAs.

A solid oxide may be used as the air electrode.

As the solid oxide may comprise, for example, a metal oxide having a perovskite crystal structure, and examples include of the metal oxide include $(Sm_aSr_{1-a})CoO_3$, $(La_aSr_{1-a})MnO_3$, $(La_aSr_{1-a})CoO_3$, $(La_aSr_{1-a})(Fe_{1-b}Co_b)O_3$, and $(La_aSr_{1-a})(Fe_{1-b}Co_bNi_c)O_3$, wherein $0 \leq a \leq 1$, $0 \leq b \leq 1$, $0 \leq c \leq 1$. The metal oxide may be used alone or in a combination comprising the metal oxide. The metal oxide may be in a form of particles. Noble metals such as platinum, ruthenium, and palladium may be used as a material for forming the air electrode. Lanthanum manganate, in which strontium, cobalt, iron, or the like is doped therein may be used as a material for forming the air electrode. For example, the lanthanum manganate may be $La_{0.8}Sr_{0.2}MnO_3$ (LSM) or $La_{0.6}Sr_{0.4}Co_{0.8}Fe_{0.2}O_3$ (LSCF).

A thickness of the electrolyte may be about 10 nanometers (nm) to about 100 micrometers (μm), for example, from about 100 nm to about 50 μm.

A cermet in which a powder for forming the electrolyte is combined with nickel oxide may be used as a material for forming the fuel electrode. The fuel electrode may further include activated carbon.

An electrochemical device according to an embodiment may be an oxygen sensor including the oxide of Formula 1. Here, the oxide maybe used, for example, as an electrolyte for an oxygen sensor.

Hereinafter, a method of preparing the oxide represented by Formula 1, according to an embodiment, will be disclosed in further detail.

First, a strontium (Sr) precursor, at least one precursor selected from magnesium (Mg) and calcium (Ca) precursor, a Group 13 element precursor, and at least one precursor selected from silicon (Si) and germanium (Ge) precursor may be mixed to prepare a precursor mixture.

A barium (Ba) precursor may be further added when manufacturing the precursor mixture.

As the Group 13 element precursor, at least one precursor selected from aluminum (Al), gallium (Ga), and indium (In) precursors may be used.

The precursor mixture may be heat treated under an oxidizing gas atmosphere to obtain the oxide represented by Formula 1.

The oxidizing gas atmosphere may be controlled using air or oxygen gas.

The precursor mixture may be dry mixed without a solvent. Also, a solvent may be further added to the precursor mixture during the process of mixing the precursor mixture. The solvent is not particularly limited and may be any suitable solvent used in the art, and examples of the solvent include water and ethanol.

Methods of mixing the precursor mixtures include mechanical milling, mechanical stirring, and ultrasonic stirring, but the method is not limited thereto and any suitable method that may be used in the art may be used.

When a solvent is used during the preparation of the precursor mixture, a process of drying the mixture to remove the solvent may be further included before heat treating the precursor mixture.

In the preparation method above, the heat treatment may be performed at a temperature of about 1000° C. to about 1500° C., but the temperature is not limited thereto and may be suitably selected without undue experimentation. When the heat treatment temperature is within the range above, the oxide having a melilite crystal structure may be obtained easily.

In the preparation method above, the duration of the heat treatment may vary according to the temperature of the heat treatment, for example, the duration may be from about 1 hour to about 10 hours, but the duration is not limited thereto and may be suitably selected without undue experimentation.

When the solvent is not used, the preparation method may, for example, be a solid-state reaction method. When the solvent is used, a liquid phase method, e.g., a sol-gel method, may be used.

In the preparation method above, the Sr precursor, Ba precursor, Mg precursor, and Ca precursor may be any suitable compound that includes Sr, Ba, Mg, and Ca, respectively.

For example, the Sr precursor, Ba precursor, Mg precursor, and Ca precursor may be at least one selected from strontium carbonate, strontium oxide, strontium chloride, strontium nitrate, barium carbonate, barium oxide, barium nitrate, barium chloride, magnesium carbonate, magnesium oxide, magnesium chloride, calcium oxide, calcium carbonate, calcium nitrate, and calcium chloride.

As the Si precursor and the Ge precursor, silicon oxide and germanium oxide, or the like are used respectively. An amount of each of the Si precursor, Ge precursor, Sr derivative, Ba derivative, Mg derivative, Ca derivative, Group 13 element derivative, Si derivative, and the Ge derivative is suitably selected to obtain the oxide represented by Formula 1.

Also, the oxide powder obtained according to the above described process may be additionally heat treated and/or compression-molded to obtain a bulk material of a selected shape.

During the compression-molding, for example, cold isostatic pressing (CIP) may be used.

An embodiment will be described in greater detail with reference to Examples and Comparative Examples. However, the Examples are for illustrative purposes only and the scope of the present disclosure is not limited thereto.

MANUFACTURING EXAMPLE 1

Preparation of Oxide

Amounts of strontium oxide ($SrCO_3$), magnesium oxide (MgO), gallium oxide ($Ga_2O_3$), germanium oxide ($GeO_2$) were selected to provide a molar ratio of Sr:Mg:Ga:Ge of 2:0.9:0.1:2.0, and the mixture thereof was sufficiently mixed using an agate mortar. 12 g of the obtained mixture was subjected to a first heat treatment in the air at a temperature of 1000° C. for 10 hours.

Then, the resultant was subjected to a second heat treatment at a temperature of 1050° C. for 10 hours, and then subjected to a third heat treatment at a temperature of 1100° C. for 10 hours to obtain an oxide of $Sr_2Mg_{0.9}Ga_{0.1}Ge_2O_7$ having a melilite structure in a powder form.

MANUFACTURING EXAMPLE 2

Preparation of Oxide

An oxide of $Sr_2Mg_{0.8}Ga_{0.2}Ge_2O_7$ was obtained in a powder form using the same method as in Manufacturing Example 1, except that the amounts of $SrCO_3$, MgO, $Ga_2O_3$, and $GeO_2$ were selected to provide a molar ratio of Sr:Mg:Ga:Ge of 2:0.8:0.2:2.0.

MANUFACTURING EXAMPLE 3

Preparation of Oxide

An oxide of $Sr_2Mg_{0.7}Ga_{0.3}Ge_2O_7$ was obtained in a powder form using the same method as in Manufacturing Example 1, except that the amounts of $SrCO_3$, MgO, $Ga_2O_3$, and $GeO_2$ were selected to provide a molar ratio of Sr:Mg:Ga:Ge of 2:0.7:0.3:2.0.

MANUFACTURING EXAMPLE 4

Preparation of Oxide

An oxide of $Sr_2Mg_{0.5}Ga_{0.5}Ge_2O_7$ was obtained in a powder form using the same method as in Manufacturing Example 1, except that the amounts of $SrCO_3$, MgO, $Ga_2O_3$, and $GeO_2$ were selected to provide a molar ratio of Sr:Mg:Ga:Ge of 2:0.5:0.5:2.0.

MANUFACTURING EXAMPLE 5

Preparation of Oxide

An oxide of $Sr_2Ga_{1.0}Ge_2O_7$ was obtained in a powder form using the same method as in Manufacturing Example 1, except that the amounts of $SrCO_3$, $Ga_2O_3$, and $GeO_2$ were selected to provide a molar ratio of Sr:Ga:Ge of 2:1.0:2.0.

MANUFACTURING EXAMPLE 6

Preparation of Oxide

The amounts of $SrCO_3$, MgO, indium oxide ($In_2O_3$), and $GeO_2$ were selected to provide a molar ratio of Sr:Mg:In:Ge of 2:0.5:0.5:2.0, and the mixture thereof was sufficiently mixed using an agate mortar. 12 g of the mixture was subjected to a first heat treatment in the air at a temperature of 1000° C. for 10 hours.

Then, the resultant was subjected to a second heat treatment at a temperature of 1050° C. for 10 hours and then subjected to a third heat treatment at a temperature of 1100° C. for 10 hours to obtain an oxide of $Sr_2Mg_{0.5}In_{0.5}Ge_2O_7$ having a melilite structure in a powder form.

MANUFACTURING EXAMPLE 7

Preparation of Oxide

An oxide of $Sr_2Mg_{0.5}Al_{0.5}Ge_2O_7$ was obtained in a powder form using the same method as in Manufacturing Example 1, except that the amounts of $SrCO_3$, MgO, aluminum oxide ($Al_2O_3$), and $GeO_2$ were selected to provide a molar ratio of Sr:Mg:Al:Ge of 2:0.5:0.5:2.0.

EXAMPLE 1

Preparation of Bulk Material

To analyze the electrical properties of the oxide powder of $Sr_2Mg_{0.9}Ga_{0.1}Ge_2O_7$ prepared according to Manufacturing Example 1, the obtained powder was inserted into a metal mold and then pressed to obtain a bulk material in a pellet form. To increase a molding density of the bulk material, a cold isostatic pressing (CIP) process was performed. Pressure during the CIP, a pressure was about 200 megapascals (MPa) and a holding time was 2 minutes.

Thereafter, for a densification process (a process of increasing the density) of the specimen, the resultant was heat treated at a temperature of 1280° C. for 10 hours to obtain a bulk material of $Sr_2Mg_{0.9}Ga_{0.1}Ge_2O_7$.

EXAMPLE 2-7

Preparation of Bulk Material

Each of the bulk materials corresponding to oxides were obtained in a pellet form using the same method as in Example 1, except that the oxide powders obtained according to Manufacturing Examples 2-7 were used instead of the oxide powder obtained according to Manufacturing Example 1.

EVALUATION EXAMPLE 1

X-Ray Diffraction (XRD) Analysis

1) Oxide of Manufacturing Example 2

To confirm whether the oxide powder obtained in Manufacturing Example 2 shows a desired phase, XRD analysis was performed, and XRD analysis according to heat treatment temperatures of the oxide powder prepared in Manufacturing Example 2 was performed as follows.

The mixture of $SrCO_3$, MgO, $Ga_2O_3$, and $GeO_2$ obtained according to Manufacturing Example 2 was subjected to a first heat treatment at a temperature of 1,000° C. for 10 hours, then subjected to a second heat treatment at a temperature of 1,050° C. for 10 hours, then subjected to a third heat treatment at a temperature of 1,100° C. for 10 hours, and then XRD analysis was performed with respect to each of the heat treatment products. The XRD analysis was performed by using an X-ray diffractometer (X'Pert, Philips), which uses Cu Kα radiation (1.540598Å).

Figure 2:
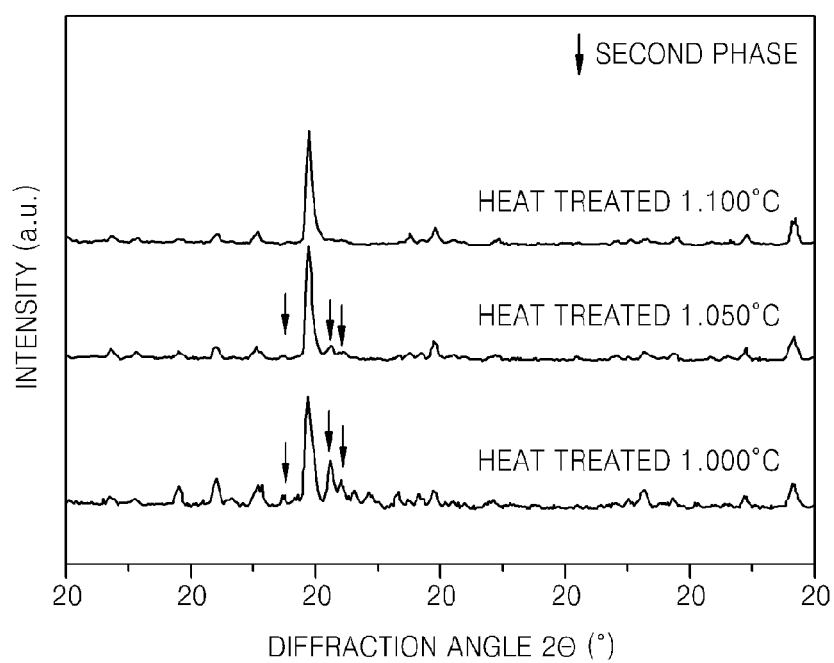
FIG. 2 is a graph of intensity (arbitrary units, a.u.) versus diffraction angle (degrees two-theta (2θ)) which shows results of X-ray diffraction (XRD) analysis of the product obtained after the heat treatment in Manufacturing Example 2.

The results of the XRD analysis as shown in FIG. 2.

Referring to FIG. 2, it is shown that after the third heat treatment, a second phase becomes substantially smaller to form a pure melilite structure (space group: p42m).

Also, when the results of the XRD of the heat treated products were obtained according to the above-described processes, the oxides, were compared to an XRD spectrum of $Sr_2(Mg_{1-x}Mn_x)Ge_2O_7$ (0.4≤x≤1.0 and 0<δ≤0.3), almost equal XRD peak indexing was observed. It may be concluded from these results that the heat treated products include therein the interstitial oxygen as in the case of $Sr_2(Mg_{1-x}Mn_x)Ge_2O_7$. Due to the presence of the interstitial oxygen, the oxides showed excellent ion conductivity.

In addition, when the XRD spectrum of $Sr_2(Mg_{1-x}Mn_x)Ge_2O_7$ (0.4≤x≤1.0) (for example, $Sr_2MnGe_2O_7$) was fitted by a Reitveld method, the fitting results showed a B value (a value showing the extent of broadening) greater than 1.

From these results, it may be known that oxygen, other than oxygen that is normally present, i.e., interstitial oxygen, is additionally present in the crystal structure of the oxide.

2) Oxides of Manufacturing Examples 2, 4, and 5

Figure 3:
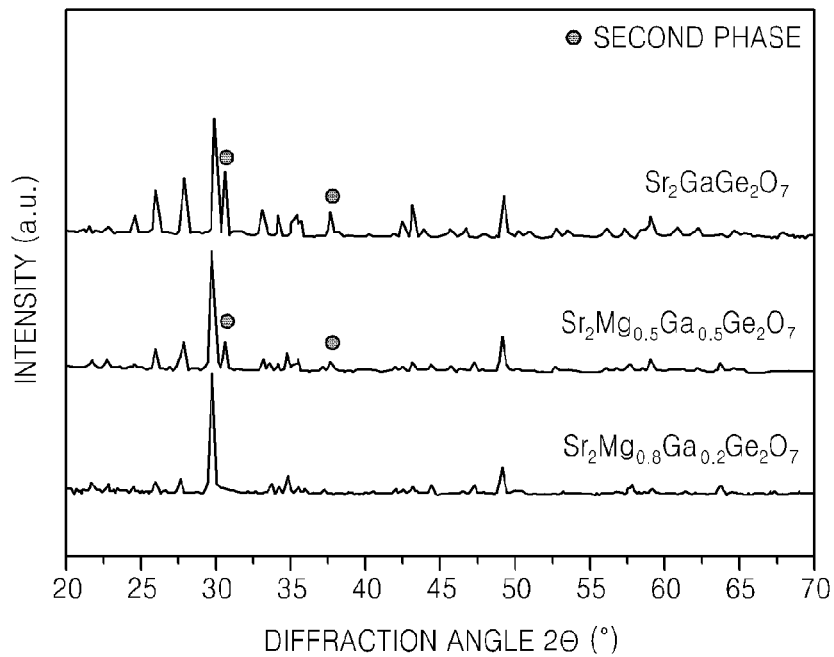
FIG. 3 is a graph of intensity (arbitrary units, a.u.) versus diffraction angle (degrees two-theta (2θ)) which shows results of XRD analyses of oxides prepared in Manufacturing Examples 2, 4, and 5.

The oxide powders obtained from Manufacturing Examples 2, 4, and 5 were subjected to XRD analyses and the results thereof are shown in FIG. 3. The XRD analyses were performed by using an X-ray diffractometer (X'Pert, Philips) that uses Cu Kα radiation (1.540598 Å).

Referring to FIG. 3, the oxide powders obtained from Manufacturing Examples 2, 4, and 5 form a phase having a melilite crystal structure.

EVALUATION EXAMPLE 2

Impedance Analysis

Resistance of the bulk material prepared in Example 2 was measured by using a two-probe method using a Material Mates 7620 impedance analyzer under a nitrogen atmosphere and varying the temperature from 600° C. The impedance measurement was performed in a range of about 0.5 Hz to about 10 MHz.

Figure 4:
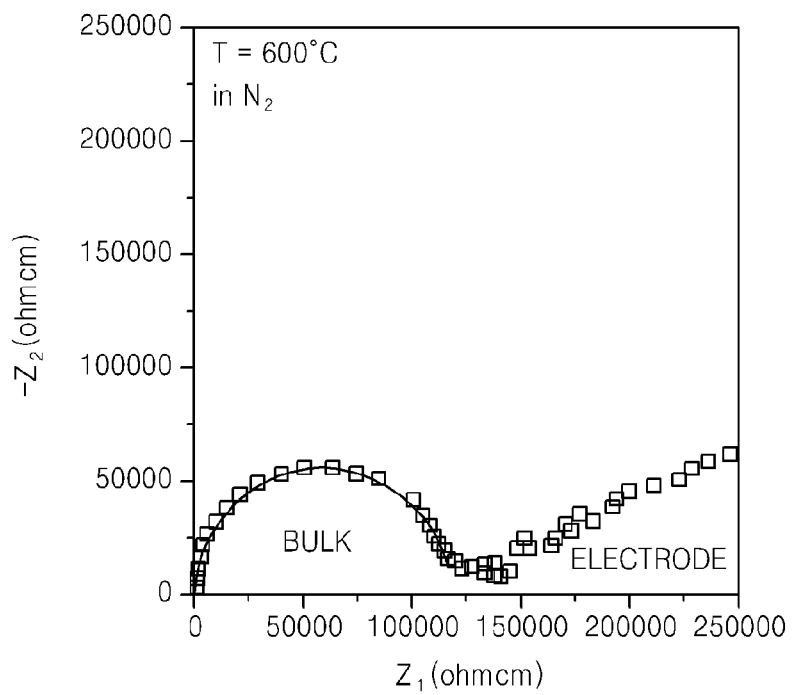
FIG. 4 is a graph of imaginary resistance ($-Z_2$, ohms-centimeters, Ωcm) versus real resistance ($Z_1$, ohms-centimeters, Ωcm) which shows results of impedance measurement of a bulk material prepared in Example 2.

A Nyquist plot of the results of the impedance measurement of the bulk prepared in Example 2 is shown in FIG. 4. A difference in resistance values of the locations where both ends of a semicircle illustrated in FIG. 4 meet the x-axis corresponds to an electrode resistance.

Figure 5:
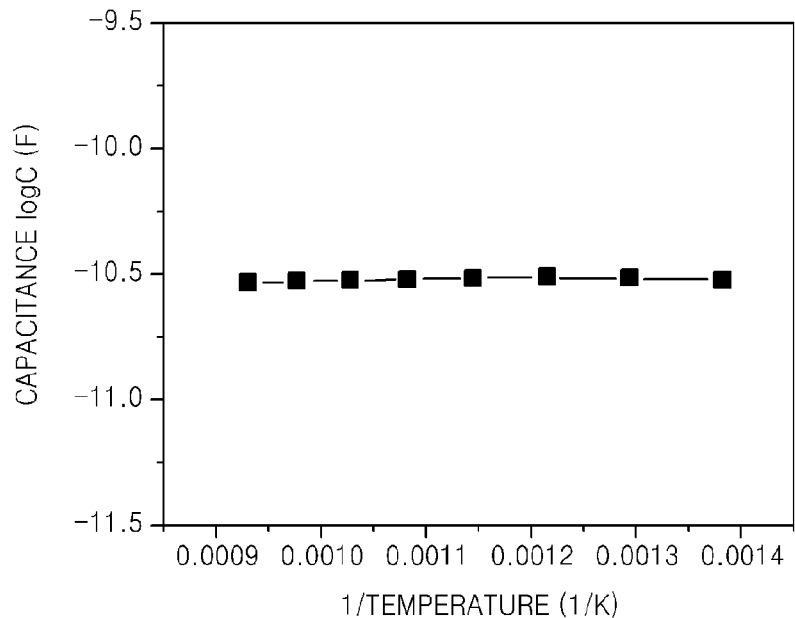
FIG. 5 is a graph of capacitance (log capacitance (C), Farads (F)) versus 1/Temperature (1/Kelvin (K)) which shows capacitance according to temperature of the bulk material prepared in Example 2.

In FIG. 4, the full line represents the results of numerical fitting by using a resistance-capacitance (RC) circuit, and resistance (R) was extrapolated from the numerical fitting. FIG. 5 illustrates capacitance (C) values obtained from the fitting according to measured temperatures.

Referring to FIG. 4, the semicircle (a high frequency region) represents an impedance pattern generated by the resistance of the specimen at a temperature of 600° C. Hence, the pattern shows that the diameter of the semicircle corresponds to the resistance of a specimen and the subsequent pattern corresponds to the electrode resistance of the bulk. To confirm whether or not the resistance is that of the specimen, numerical fitting was performed by using a resistance-capacitance circuit. The dotted line represents results of the fitting and reliability of the fitting was very high.

Referring to FIG. 5, a capacitance value shows a typical bulk ceramic value and the semicircle of FIG. 4 shows that it resulted from the resistance of the bulk. Also, the bulk material of Example 2 has a pattern that shows a large electrode resistance (forming a subsequent pattern) and from this, it may be known that the bulk material of Example 2 is an ion conductor.

Also, the impedance of the bulk materials prepared in Examples 1, 3, 4, 5, and 6 were measured according to the same method as in the case of the bulk material prepared in Example 2.

Results of the impedance measurement showed that the bulk materials prepared in Examples 1, 3, 4, 5, and 6 has ion conductivity as in the case of the bulk material prepared in Example 2.

EVALUATION EXAMPLE 3

Measurement of Ion Conductivity

1) Bulk Materials Prepared in Examples 2 and 6

Figure 6:
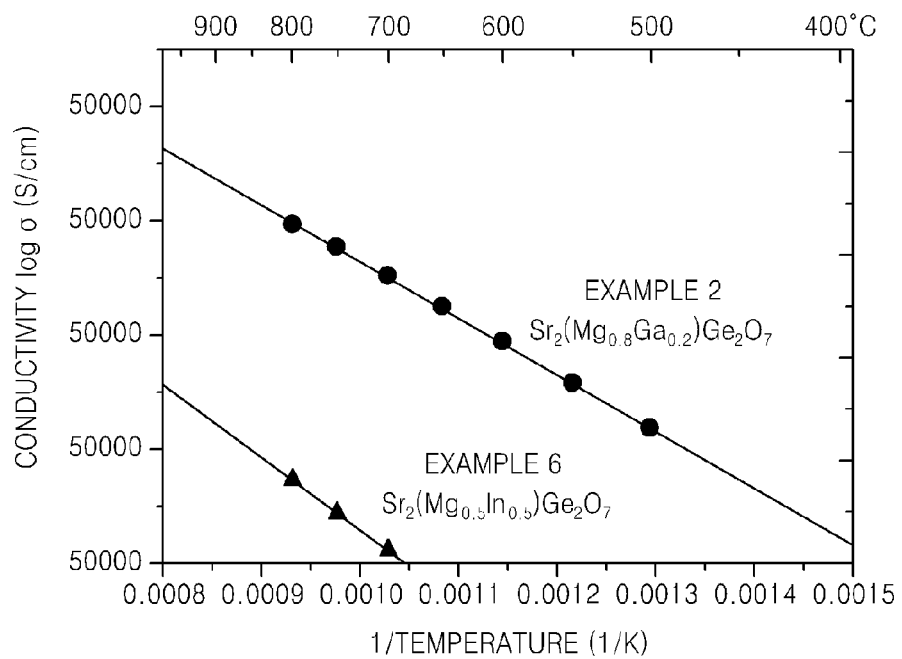
FIG. 6 is a graph of conductivity (log conductivity (σ), Siemens per centimeter, (S/cm)) versus 1/Temperature (1/Kelvin (K)) showing ion conductivities of bulk materials prepared in Example 2 and Example 6.

Ion conductivity was obtained from the impedance patterns of the bulk materials prepared in Examples 2 and 6 according to Evaluation Example 2 and the results thereof are shown in FIG. 6.

Referring to FIG. 6, it may be known that the bulk materials of Examples 2 and 6 have excellent ion conductivity.

2) Bulk Materials Prepared in Examples 1 to 5

Figure 7:
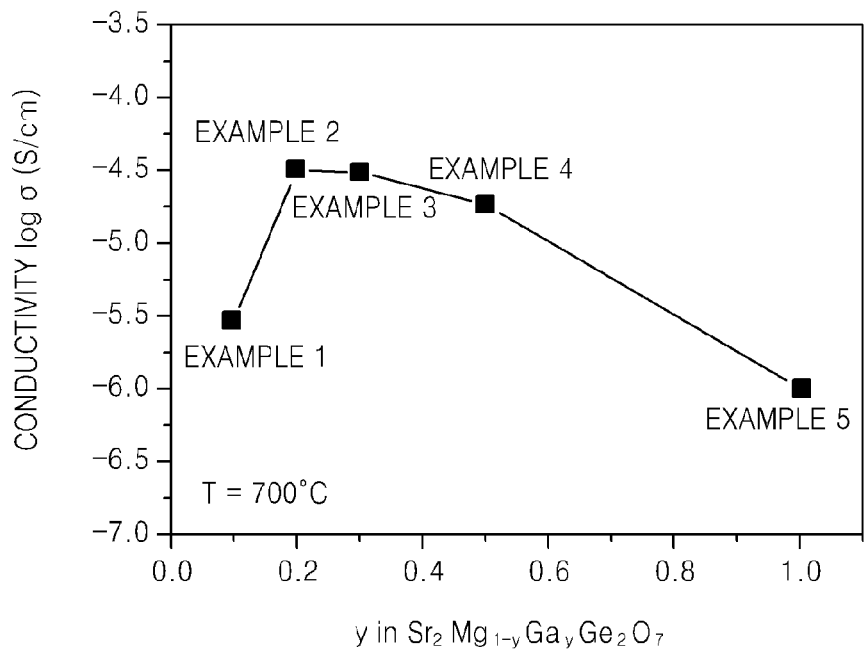
FIG. 7 is a graph of conductivity (log conductivity (σ), Siemens per centimeter, (S/cm)) versus y in $Sr_2Mg_{1-y}Ga_yGe_2O_7$ showing ion conductivities of bulk materials prepared in Examples 1-5.
Figure 8A:
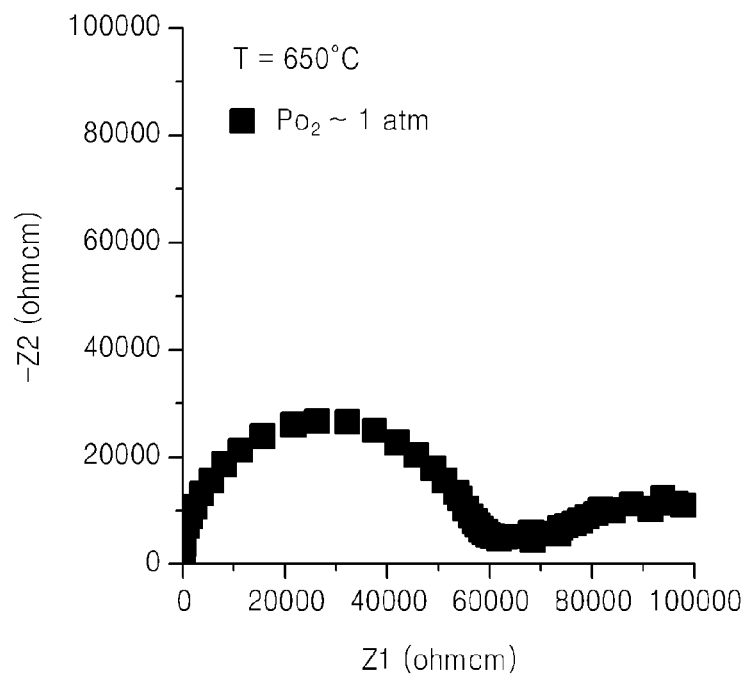
FIGS. 8A to 8F are each a graph of imaginary resistance ($-Z_2$, ohms-centimeters, Ωcm) versus real resistance ($Z_1$, ohms-centimeters, Ωcm) which show results of impedance measurements of the bulk material prepared in Example 2 at various oxygen partial pressures.
Figure 8B:
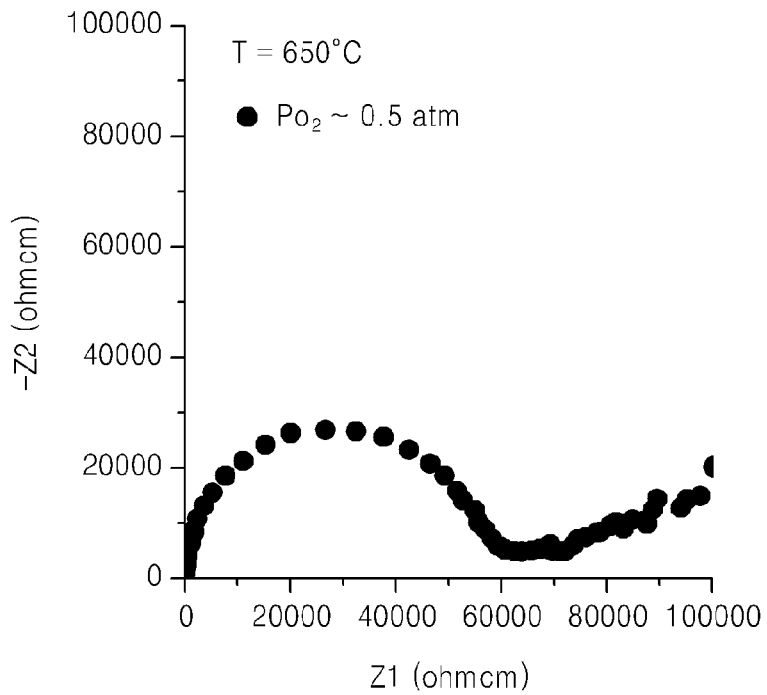
Figure 8C:
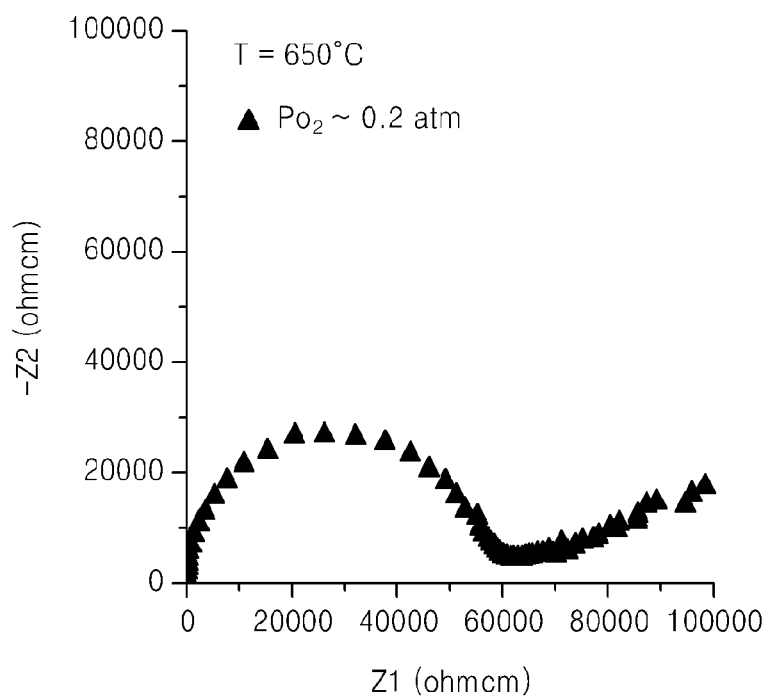
Figure 8D:
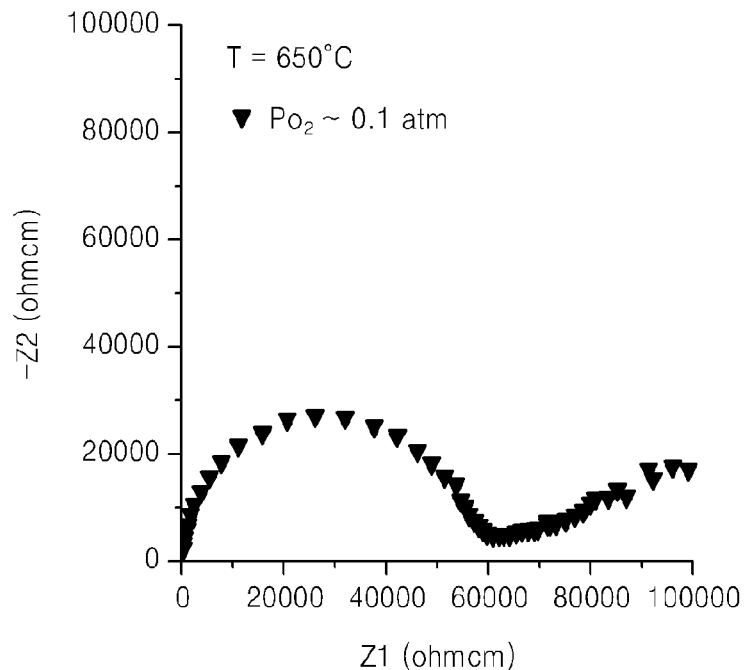
Figure 8E:
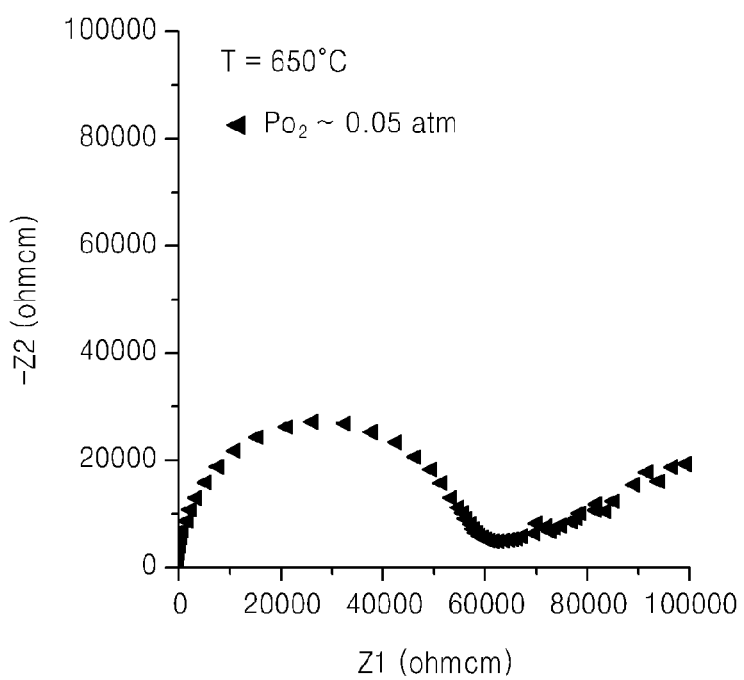
Figure 8F:
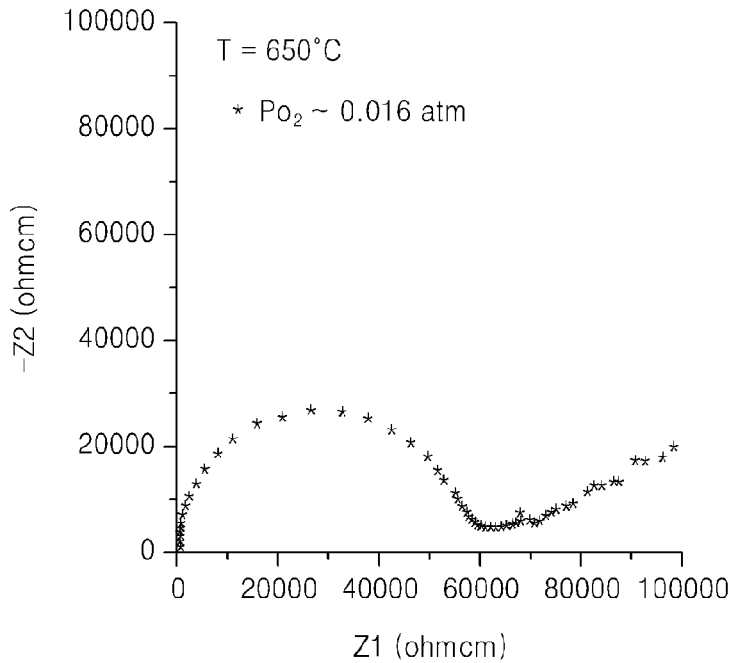
Figure 9:
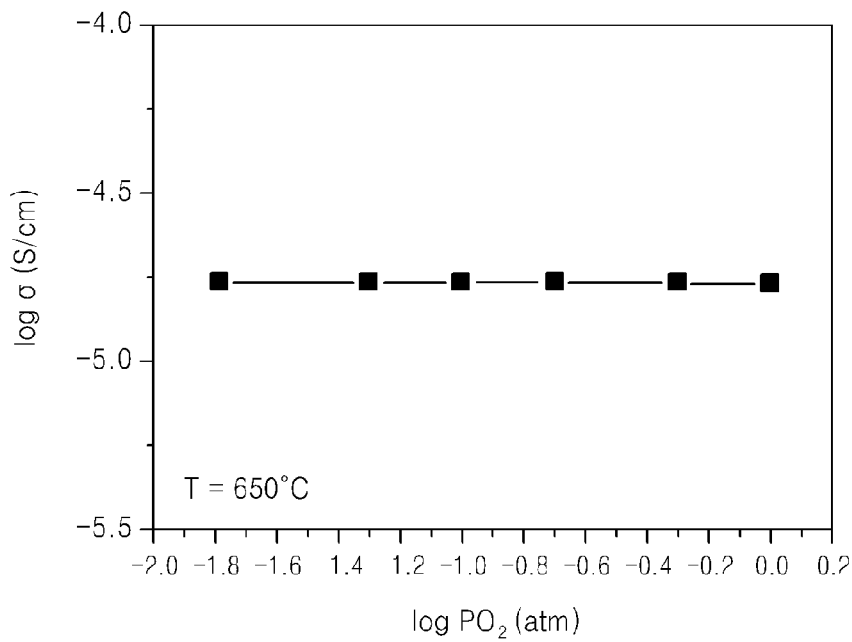
FIG. 9 is a graph of conductivity (log conductivity (σ), Siemens per centimeter, (S/cm)) versus oxygen partial pressure (log pressure ($P_{O2}$), (atmospheres, atm)) showing ion conductivity of the bulk material prepared in Example 2 according to oxygen partial pressures.

Ion conductivity was obtained from the impedance patterns of the bulk materials prepared in Examples 1-5 according to Evaluation Example 2, and the results thereof are shown in FIG. 7.

Referring to FIG. 7, the bulk materials prepared in Examples 1-5 have excellent ion conductivity, and in particular, the bulk material prepared in Example 2 showed the highest ion conductivity.

EVALUATION EXAMPLE 4

Measurement of Impedance and Ion Conductivity of Bulk Material According to Oxygen Partial Pressure Resistance of the bulk material obtained according to Example 2 was measured by using a two-probe method by using a Material Mates 7260 impedance analyzer at a temperature of 650° C., while varying the oxygen partial pressure in a range from $10^{-2}$ atmospheres (atm) to 1 atm. The impedance measurement was performed in a range from about 0.5 Hz to about 10 MHz. The oxygen partial pressure was adjusted by mixing oxygen gas and nitrogen gas.

The impedance analysis results of the bulk material prepared in Example 2 are shown in FIGS. 8A to 8F. Ion conductivities obtained from the impedance patterns of FIGS. 8A to 8F are shown as functions of oxygen partial pressures.

Referring to FIGS. 8A to 8F, and FIG. 9, based on an observation that a size of the semicircle did not change despite changes in the oxygen partial pressure, it may be determined that the electrical conductors that causes the resistance of the bulk material are not electrons but are oxygen ions. This is because electron conductivity of an oxide is dependent upon the oxygen partial pressure whereas the ion conductivity of the oxide is independent of the oxygen partial pressure.

The oxide according to an embodiment has large oxygen ion mobility and thus, when the oxide is used, an electrolyte having improved ion conductivity may be obtained. By using the oxide, an electrochemical device having improved performance may be manufactured.

It should be understood that the exemplary embodiments described herein are to be considered in a descriptive sense only and not for purposes of limitation. Descriptions of features, advantages, or aspects within each embodiment shall be considered as available for other similar features, advantages, or aspects in other embodiments.

What is claimed is:

1. An oxide represented by Formula 1:

$(Sr_{2-x}A_x)(M_{1-y}Q_y)D_2O_{7+d}$        Formula 1 wherein A is barium (Ba),
M is at least one selected from the group consisting of magnesium (Mg) and calcium (Ca),
Q is a Group 13 element,
D is at least one selected from the group consisting of silicon (Si) and germanium (Ge), $0 \leq x \leq 2.0$, $0 < y \leq 1.0$, and d is a value which makes the oxide electrically neutral.

2. The oxide of claim 1, wherein Q is at least one selected from the group consisting of aluminum (Al), gallium (Ga), and indium (In).

3. The oxide of claim 1, wherein in Formula 1 y is about 0.1 to about 0.5 or y is 1.0.

4. The oxide of claim 1, wherein in Formula 1 x is 0.

5. The oxide of claim 1, wherein the oxide is an ion conductor.

6. The oxide of claim 1, wherein crystal structure of the oxide belongs to $P42_1m$ space group.

7. The oxide of claim 1, wherein crystal structure of the oxide is that of melilite.

8. The oxide of claim 1, wherein the oxide comprises interstitial oxygen.

9. The oxide of claim 1, wherein the oxide is $(Sr_{2-x}A_x)(M_{1-y}Q_y)Ge_2O_{7+d}$ wherein, A is barium (Ba),
M is at least one selected from the group consisting of magnesium (Mg) and calcium (Ca),
Q is at least one selected from the group consisting of aluminum (Al), gallium (Ga) and indium (In),
$0 \leq x \leq 2.0$, $0 < y \leq 1.0$, and
d is a value which makes the oxide electrically neutral.

10. The oxide of claim 1, wherein the oxide represented by Formula 1 is $Sr_2(Mg_{0.9}Ga_{0.1})Ge_2O_7$, $Sr_2(Mg_{0.8}Ga_{0.2})Ge_2O_7$, $Sr_2(Mg_{0.7}Ga_{0.3})Ge_2O_7$, $Sr_2(Mg_{0.6}Ga_{0.4})Ge_2O_7$, $Sr_2(Mg_{0.5}Ga_{0.5})Ge_2O_7$, $Sr_2Ga_{1.0}Ge_2O_7$, $Sr_2(Mg_{0.9}In_{0.1})Ge_2O_7$, $Sr_2(Mg_{0.8}In_{0.2})Ge_2O_7$, $Sr_2(Mg_{0.7}In_{0.3})Ge_2O_7$, $Sr_2(Mg_{0.6}In_{0.4})Ge_2O_7$, $Sr_2(Mg_{0.5}In_{0.5})Ge_2O_7$, $Sr_2In_{1.0}Ge_2O_7$, $Sr_2(Mg_{0.9}Al_{0.1})Ge_2O_7$, $Sr_2(Mg_{0.8}Al_{0.2})Ge_2O_7$, $Sr_2(Mg_{0.7}Al_{0.3})Ge_2O_7$, $Sr_2(Mg_{0.6}Al_{0.4})Ge_2O_7$, $Sr_2(Mg_{0.5}Al_{0.5})Ge_2O_7$, or $Sr_2Al_{1.0}Ge_2O_7$.

11. The oxide of claim 10, wherein the oxide represented by Formula 1 is $Sr_2(Mg_{0.9}Ga_{0.1})Ge_2O_7$, $Sr_2(Mg_{0.8}Ga_{0.2})Ge_2O_7$, $Sr_2(Mg_{0.7}Ga_{0.3})Ge_2O_7$, $Sr_2(Mg_{0.6}Ga_{0.4})Ge_2O_7$, $Sr_2(Mg_{0.5}Ga_{0.5})Ge_2O_7$, $Sr_2Ga_{1.0}Ge_2O_7$, or $Sr_2(Mg_{0.5}In_{0.5})Ge_2O_7$.

12. The oxide of claim 1, wherein ion conductivity of the oxide is about $10^{-7}$ to about $10^{-2}$ Siemens per centimeter.

13. An electrolyte comprising an oxide represented by Formula 1:

$(Sr_{2-x}A_x)(M_{1-y}Q_y)D_2O_{7+d}$   Formula 1 wherein, A is barium (Ba),
M is at least one selected from the group consisting of magnesium (Mg) and calcium (Ca),
Q is a Group 13 element,
D is at least one selected from the group consisting silicon (Si) and germanium (Ge), $0 \leq x \leq 2.0$, $0 < y \leq 1.0$, and d is a value which makes the oxide electrically neutral.

14. The electrolyte of claim 13, wherein Q is at least one selected from the group consisting of aluminum (Al), gallium (Ga), and indium (In).

15. The electrolyte of claim 13, wherein the oxide is $(Sr_{2-x}A_x)(M_{1-y}Q_y)Ge_2O_{7+d}$ wherein, A is barium (Ba),
M is at least one selected from the group consisting of magnesium (Mg) and calcium (Ca),
Q is at least one selected from the group consisting of aluminum (Al), gallium (Ga), and indium (In),
$0 \leq x \leq 2.0$, $0 < y \leq 1.0$, and
d is a value which makes the oxide electrically neutral.

16. The electrolyte of claim 13, wherein the oxide represented by Formula 1 is $Sr_2(Mg_{0.9}Ga_{0.1})Ge_2O_7$, $Sr_2(Mg_{0.8}Ga_{0.2})Ge_2O_7$, $Sr_2(Mg_{0.7}Ga_{0.3})Ge_2O_7$, $Sr_2(Mg_{0.6}Ga_{0.4})Ge_2O_7$, $Sr_2(Mg_{0.5}Ga_{0.5})Ge_2O_7$, $Sr_2Ga_{1.0}Ge_2O_7$, $Sr_2(Mg_{0.9}In_{0.1})Ge_2O_7$, $Sr_2(Mg_{0.8}In_{0.2})Ge_2O_7$, $Sr_2(Mg_{0.7}In_{0.3})Ge_2O_7$, $Sr_2(Mg_{0.6}In_{0.4})Ge_2O_7$, $Sr_2(Mg_{0.5}In_{0.5})Ge_2O_7$, $Sr_2In_{1.0}Ge_2O_7$, $Sr_2(Mg_{0.9}Al_{0.1})Ge_2O_7$, $Sr_2(Mg_{0.8}Al_{0.2})Ge_2O_7$, $Sr_2(Mg_{0.7}Al_{0.3})Ge_2O_7$, $Sr_2(Mg_{0.6}Al_{0.4})Ge_2O_7$, $Sr_2(Mg_{0.5}Al_{0.5})Ge_2O_7$, or $Sr_2Al_{1.0}Ge_2O_7$.

17. An electrochemical device comprising an oxide represented by Formula 1:

$(Sr_{2-x}A_x)(M_{1-y}Q_y)D_2O_{7+d}$   Formula 1 wherein, A is barium (Ba),
M is at least one selected from the group consisting of magnesium (Mg) and calcium (Ca),
Q is a Group 13 element,
D is at least one selected from the group consisting of silicon (Si) and germanium (Ge),
$0 \leq x \leq 2.0$, $0 < y \leq 1.0$, and d is a value which makes the oxide electrically neutral.

18. The electrochemical device of claim 17, wherein the electrochemical device is selected from the group consisting of an electrolytic device, an oxygen permeable membrane, an oxygen gas pump, a fuel cell, a sensor, a pump, an electrochromic window, a lithium battery, and a thin film integrated battery.

19. The electrochemical device of claim 18, wherein the oxide is $(Sr_{2-x}A_x)(M_{1-y}Q_y)Ge_2O_{7+d}$ wherein, A is barium (Ba),
M is at least one selected from the group consisting of magnesium (Mg) and calcium (Ca),
Q is at least one selected from the group consisting of aluminum (Al), gallium (Ga), and indium (In),
$0 \leq x \leq 2.0$, $0 < y \leq 1.0$, and
d is a value which makes the oxide electrochemically neutral.

20. The electrochemical device of claim 18, wherein the oxide represented by Formula 1 is $Sr_2(Mg_{0.9}Ga_{0.1})Ge_2O_7$, $Sr_2(Mg_{0.8}Ga_{0.2})Ge_2O_7$, $Sr_2(Mg_{0.7}Ga_{0.3})Ge_2O_7$, $Sr_2(Mg_{0.6}Ga_{0.4})Ge_2O_7$, $Sr_2(Mg_{0.5}Ga_{0.5})Ge_2O_7$, $Sr_2Ga_{1.0}Ge_2O_7$, $Sr_2(Mg_{0.9}In_{0.1})Ge_2O_7$, $Sr_2(Mg_{0.8}In_{0.2})Ge_2O_7$, $Sr_2(Mg_{0.7}In_{0.3})Ge_2O_7$, $Sr_2(Mg_{0.6}In_{0.4})Ge_2O_7$, $Sr_2(Mg_{0.5}In_{0.5})Ge_2O_7$, $Sr_2In_{1.0}Ge_2O_7$, $Sr_2(Mg_{0.9}Al_{0.1})Ge_2O_7$, $Sr_2(Mg_{0.8}Al_{0.2})Ge_2O_7$, $Sr_2(Mg_{0.7}Al_{0.3})Ge_2O_7$, $Sr_2(Mg_{0.6}Al_{0.4})Ge_2O_7$, $Sr_2(Mg_{0.5}Al_{0.5})Ge_2O_7$, or $Sr_2Al_{1.0}Ge_2O_7$.

* * * * *